United States Patent
Rauwendaal

[11] Patent Number: 5,909,958
[45] Date of Patent: Jun. 8, 1999

[54] SCREW EXTRUDER WITH INDEPENDENTLY ADJUSTABLE GROOVE DEPTH

[75] Inventor: Chris J. Rauwendaal, Los Altos, Calif.

[73] Assignee: Rauwendaal Extrusion Engineering, Inc., Los Altos Hills, Calif.

[21] Appl. No.: 08/846,129

[22] Filed: Apr. 25, 1997

[51] Int. Cl.$^6$ ...................... B29B 7/60
[52] U.S. Cl. ...................... 366/76.2; 366/76.93
[58] Field of Search .......... 366/69, 76.1, 76.2, 366/76.93, 79, 80, 90, 302, 307, 318; 425/204, 208, 209

[56] References Cited

U.S. PATENT DOCUMENTS

| | | | |
|---|---|---|---|
| 4,462,691 | 7/1984 | Boguslawski | 366/80 |
| 4,462,692 | 7/1984 | Meyer | 366/89 |
| 4,629,326 | 12/1986 | Huls | 366/80 |
| 4,678,339 | 7/1987 | Peiffer et al. | |
| 5,190,771 | 3/1993 | Baumgarten | 366/80 |
| 5,783,225 | 7/1998 | Bacher et al. | 366/76.1 |

OTHER PUBLICATIONS

Rauwendaal, Chris, *Polymer Extrusion* 1986 pp. 65–66 Hanser Publishers, Munich, Macmillian Co. Inc., U.S.
Rauwendaal, Chris, *Polymer Extrusion* 1986 p. 246 Hanser Publishers, Munich, Macmillian Co. Inc. U.S.
Rauwendaal, Chris, Polymer Extrusion 1986 p. 249 Hanser Publishers, Munich, Macmillian Co. Inc., U.S.
Levy, Sidney, *Plastic Extrusion Technology Handbook*, 2nd 1989, pp. 69–71, Undustrial Press, Inc., U.S.

*Primary Examiner*—Charles E. Cooley
*Attorney, Agent, or Firm*—Larry B. Guernsey; Michael J. Hughes

[57] ABSTRACT

A screw extruder (10), including a barrel assembly (12) having a central bore (36) which defines an inner surface (37). An extruder screw (38) is positioned within the barrel assembly's (12) central bore (36). The barrel assembly (12) has an input end (20) which includes a feed housing portion (25), the feed housing portion (25) having an opening for introduction of material into the central bore (36). There is a shaping die (18) situated at the output end (16) of the barrel assembly (12) to shape the extruded material. The feed housing portion (25) also has one or more groove channels (44) opening into the inner surface (37) of the feed housing portion (25) with a key (48) disposed in each of these groove channels (44). Contacting each key (48) are one or more independently activated actuators (28) which can be used to adjust the radial depths of the keys (48) in the groove channels (44) thus controlling the depth of grooves (46) formed between the keys (48) and the central bore (36) of the barrel (12). A control loop may be established by monitoring a process parameter such as barrel assembly pressure by a sensor (32). This data is fed to a process controller (34), which then adjusts the actuators (28) independently to control the groove (46) depths and thus control the process parameter. Also disclosed is a method for controlling extrusion from a screw extruder (10).

21 Claims, 4 Drawing Sheets

SCREW EXTRUDER WITH INDEPENDENTLY ADJUSTABLE GROOVE DEPTH

TECHNICAL FIELD

The present invention relates generally to machines for extrusion of materials and more particularly to screw extruders adapted for use with plastics and plastic-like materials.

BACKGROUND OF THE INVENTION

In a screw extruder, material, usually some form of plastic, is forced under pressure to flow through an contoured orifice in order to shape the material. Screw extruders are generally composed of a housing, which is usually a cylindrical barrel section, surrounding a central motor-driven screw. At a first end of the barrel is a feed housing containing a feed opening through which new material, usually plastic particles, is introduced into the barrel. The material is then conveyed by the screw toward the second end of the barrel through a melting zone where it is heated under carefully controlled conditions to melt the material. It is then conveyed through a melt-conveying zone, also called a pumping zone because it acts as a pump for the melted material. The melted plastic is finally pressed through a shaped opening or die to form the extrudate.

A common problem in this process is fluctuations due to variations in feeding and conveying of the plastic particles in the barrel of the extruder. The driving force for the forward conveyance of the material is the frictional force between the plastic particles and the barrel surface in the feed section. Plastics such as polypropylene have low coefficients of friction against steel. With a smooth barrel surface, the frictional force can be too low to ensure consistent forward conveyance, resulting in erratic performance and poor efficiency of material conveying.

A common solution to feeding problems due to insufficient barrel friction is to machine grooves into the throat of the barrel in the feed section of the extruder. This has the advantage of providing high extruder output with more stable extruder performance. Additionally, it may provide the ability to process plastics with very high molecular weights.

The disadvantages of using grooves include the generation of high pressures, which can lead to high motor loads, high melt temperatures and rapid wear of the screw and barrel. Permanent grooves also require a higher start-up torque than a smooth barrel, necessitating a more powerful electric motor for start-up than will be required in subsequent operation, as well as stronger screw and barrel parts.

It is important that the feed section be thermally insulated from the melting section. Due to heat generated by friction, the feed section may additionally require cooling to make sure the plastic particles do not melt in the grooved section of the extruder. Thus, it may be necessary to provide cooling systems for barrels with grooved throats. This provides yet another disadvantage because a great amount of energy is lost through the intensive cooling of the grooved barrel section. Experimental studies have shown that as much as 30–40% of the mechanical energy may be lost through the cooling water.

The form and size of the pellets also affect the frictional characteristics of the material. For instance, in a grooved throat designed to operate with essentially round pellets, cubic pellets may be conveyed with a much higher efficiency. This may require that barrels with non-adjustable grooves be designed for specific materials.

Another disadvantage of grooved barrels is that material can accumulate in the grooves. This can cause problems when changing from one product to another as mixing in this residue can affect the purity of the subsequent material.

Poor performance and rapid wear of the equipment may also result when there is a mismatch of efficiencies between the screw in conveying the material and the heating zones in melting the material. If the screw conveys the solid material too efficiently, it may deliver it faster than the melting and melt conveying zones can process the material. This can result in erratic operation as the machine drives unmelted and unplasticated material through the melting zone. This may, in extreme cases, result in very high pressures in the barrel that can lead to risk of barrel rupture. It is thus advantageous to have a method of controlling the conveying efficiency in the feed zone so that it may be matched with that of the melting and melt-conveying zones.

The efficiency of conveying of material by the screw may be controlled by several factors. One way to adjust this conveying efficiency is to change the temperature of the barrel in the feed section. This is often done, but has the disadvantage that temperature adjustment has only a weak effect on conveying efficiency. Similarly, the temperature of the screw in the feed section may be adjusted. However, this method also has a weak effect and is additionally more complicated to control than barrel temperature.

As discussed above, the amount of frictional force at the barrel is a factor in the conveying efficiency. The presence and the specific geometry of grooves in the barrel can be used to directly change this efficiency. The number of grooves, the length of grooves, and the groove depth determine the frictional effect. A continuous adjustment of the number of grooves is not likely. Adjustment of the length of the grooves is possible, but generally will be mechanically complex due to the large change in groove length that is likely to be required. The typical axial length of the grooves is two to five barrel diameters. Thus the adjustment length would have to be in the range of two to five barrel diameters as well. This may be an impractical length to adjust. Therefore, the most convenient method of controlling the frictional effect and thus the conveying efficiency would appear to be to adjust the depth of the grooves. The groove depth is typically from 0–0.12 inches (0–3 mm). The range of adjustment would thus be only about 0.12 inches, which is typically about half the size of the plastic pellets usually used. This method has the advantage of being immediately effective with no time lag involved, in contrast with temperature control methods.

If the groove depth is adjustable to zero, the difficulties previously mentioned concerning start-up torque and necessary over-design of the motor may be avoided. This results in cost savings since the motor, screw and barrel parts may be designed for smaller stresses. Once operating speed has been achieved, the grooves may be continuously adjusted to obtain optimal conveying efficiency.

U.S. Pat. No. 4,678,339 by Peiffer et al. describes a mechanism for adjusting the depth of grooves in the feed housing of a screw extruder. Adapters in grooves in the inner surface of the barrel are biased radially outward by helical springs surrounding the adapter's attachment bolts that are grouped in circumferential sets. The heads of these bolts are attached to rollers that contact the inner surface of a cam ring. Rotation of the cam ring relative to the bolt heads allow the bolts to be moved radially inward or outward, and thus to raise or lower the adapters in the grooves. Rotation of the ring does not allow for movement of individual bolts in a circumferential set, as all move in unison. As a consequence, the adapters are not capable of such fine adjustment as would a screw extruder with individually adjustable adapters and therefore operating parameters and objectives may not be as precisely controlled.

The cam ring mechanism of Peiffer '339 is comparatively bulky and complex. It can also interfere with incorporation of a cooling system into the feed zone of the barrel. As discussed earlier, good cooling is important to avoid melting of the plastic, which will have an effect on frictional properties and conveying efficiency.

For the foregoing reasons, there is a need for a screw extruder with individually adjustable groove depths and whose adjustment mechanisms are less complex, bulky and expensive to use and maintain.

DISCLOSURE OF THE INVENTION

Accordingly, it is an object of the present invention to provide a screw extrusion barrel with improved adjustable depth grooves which are more precisely adjustable than in previous devices.

Another object is to provide independent adjustment of groove depths.

Yet another object of the invention is to provide continuous adjustment of conveying efficiency, by means of precise groove control, in order to match to melting and melt-conveying efficiencies by allowing adjustment of groove depth on any or all of the grooves.

A further object is to provide precise adjustment to accommodate various types, forms and sizes of plastic pellets, by allowing independent adjustment of groove depth on any or all of the grooves.

A still further object is to provide precise adjustment to allow variation in cooling, by allowing adjustment of groove depth on any or all of the grooves.

An additional object is to minimize start-up torque, by allowing initial adjustment of groove depth to zero on any or all of the grooves.

A further additional object is to prevent material accumulation in the grooves that may impede product change-over by allowing adjustment to zero depth on any or all of the grooves.

Moreover, another object is to provide a system for adjusting the depth of the grooves, which is simpler, more reliable, and less bulky than in previous devices.

And a still further object is to provide an adjustment mechanism which is substantially less expensive than in previous devices.

And an additional object is to provide an adjustment mechanism that may more easily interface with feedback mechanisms to provide continuous self-adjustment of process parameters such as diehead pressure, screw torque, plastics melt temperature, cooling water temperature and barrel pressure.

The present invention is directed to a screw extruder, which satisfies the need for more precise adjustment of groove depth resulting in improved control of various production parameters during operation. Briefly, one preferred embodiment of the present invention is a screw extruder including a barrel assembly having a central bore which defines an inner surface. The barrel assembly has an input end and an output end with an extruder screw being positioned within the central bore. The barrel assembly input end further includes a feed housing portion, the feed housing portion having an opening for introduction of material into the central bore. The feed housing portion may be a separate structure which forms the input end of the barrel assembly and which may be separated from the downstream portion of the barrel assembly by a thermal barrier, or it may be an integral part of the barrel assembly. The barrel assembly also has a die situated at the output end of the barrel assembly for shaping the extrudate. There are one or more groove channels which open into the inner surface of the feed housing portion and a key disposed in each of these groove channels. There are one or more independently controlled actuators that can be used to adjust the radial depth of the keys in the groove channels thus providing the necessary precise adjustment of the depth of the grooves and the resulting improved control of the device operations.

The described versions of the present invention have many advantages which address the above-mentioned objects. One such advantage is that the present independently controlled adjustment mechanisms are more precisely adjustable than in previous devices.

Another advantage of the present invention is that by providing independent adjustment of groove depths, conveying efficiency can be continuously varied in order to match melting and melt-conveying efficiencies.

And another advantage is that any or all of the grooves can be adjusted precisely to accommodate various types, forms and sizes of plastic pellets.

A further advantage is that adjustment of any or all of the grooves may easily be made to vary cooling requirements.

A still further advantage is that any or all of the groove depths may be adjusted to zero to minimize start-up torque, thus reducing the power design requirements for the motor and reducing costs.

An additional advantage is that material accumulation in the grooves may be eliminated by setting any or all of the groove depths to zero, a setting which also facilitates cleaning.

A further additional advantage is that the actuator mechanisms for adjusting groove depths are simpler and more reliable than in previous devices.

Yet another advantage is that the adjustment mechanisms are less bulky than in previous devices, which allows for easier incorporation of a cooling system.

Moreover, another advantage is that the present adjustment mechanisms are substantially less expensive than in previous devices.

A still further advantage is that the present adjustment mechanisms may more easily interface with feedback mechanisms to provide continuous self-adjustment of process parameters such as diehead pressure, screw torque, plastics melt temperature, cooling water supply requirements and barrel assembly pressure.

These and other objects and advantages of the present invention will become clear to those skilled in the art in view of the best presently known mode of carrying out the invention and the industrial applicability of the preferred embodiment as described herein and as illustrated in the several figures of the drawings.

BRIEF DESCRIPTION OF THE DRAWINGS

The purposes and advantages of this version of the present invention will be apparent from the following detailed description in conjunction with the appended drawings in which.

BEST MODE FOR CARRYING OUT THE INVENTION

A preferred embodiment of the present invention is a screw extruder having groove channels with independently adjustable keys that can be raised or lowered within the groove channels to adjust the radial depth of the grooves. As illustrated in the various drawings herein, and particularly in the view of FIG. 1, one form of this preferred embodiment of the inventive device is a screw extruder with independently adjustable groove depth which is designated by the general reference character 10. Generally, for convenience of reference, the terms "downstream" shall refer to those ends closest to the output portion of the screw extruder and the term "upstream" shall refer to those ends farthest away from the output. The "downstream" direction is indicated by a large arrow in both FIG. 1 and FIG. 2.

Figure 1:
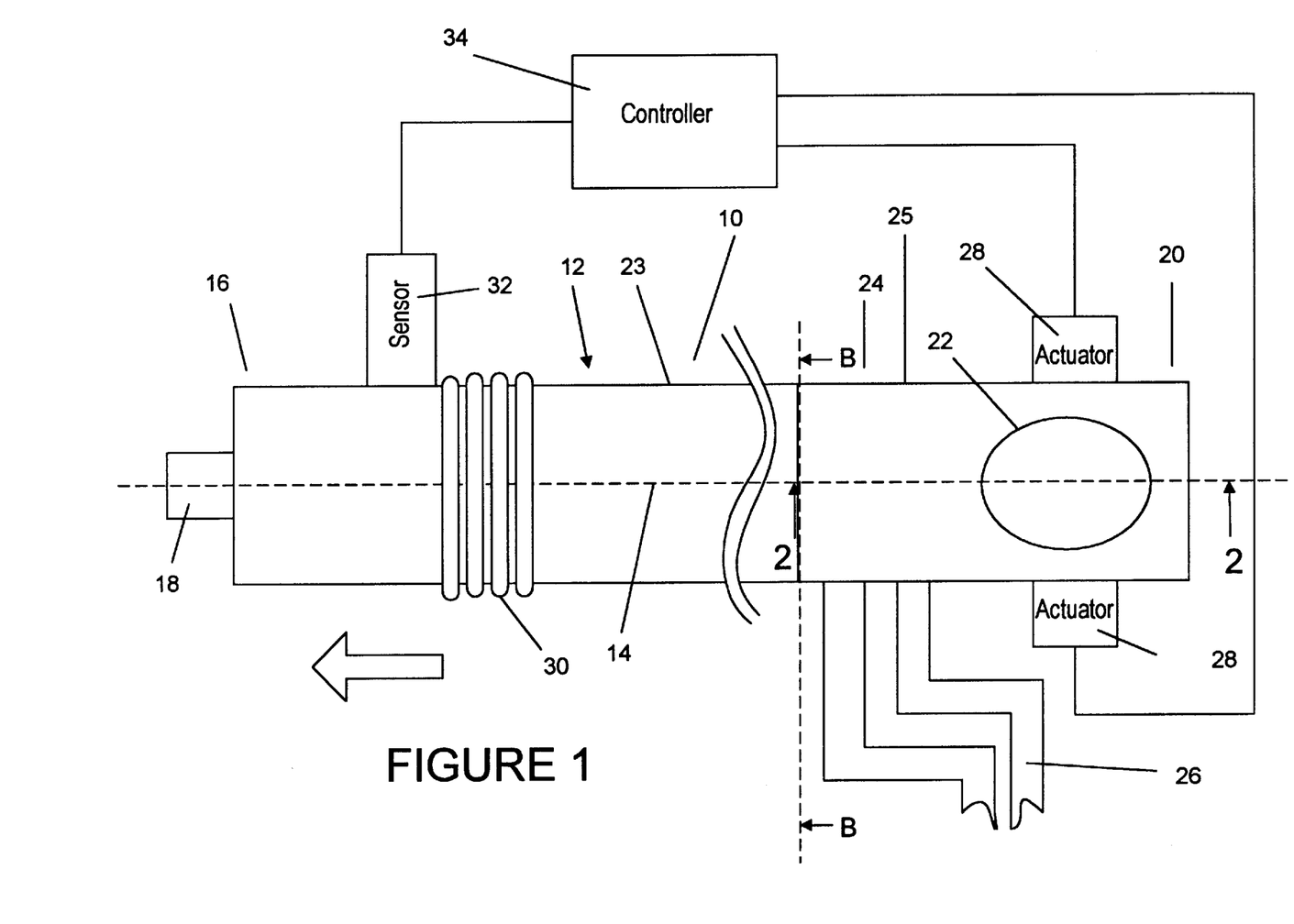
FIG. 1 is a top view block diagram of a screw extruder incorporated into a process control system according to one embodiment of the present invention.

FIG. 1 illustrates a top view of a screw extruder 10, which has been incorporated into a process control system. The basic elements have been shown in block form to show the orientation of these elements and their interactions.

The screw extruder 10 has a barrel assembly 12 with a central axis 14. The downstream end of the screw extruder 10 terminates in an output end 16, which has an extruder die 18. The opposite end which lies upstream will be designed the input end 20, and has a feed hopper 22 for introduction of material.

The portion of the screw extruder 10 that contains the apparatus for feeding in plastic pellets and conveying them downstream is generally thermally insulated from the area in which the plastic is melted. This portion for feeding and conveyance shall be referred to as the "feed zone". The feed zone is shown in FIG. 1 as the portion upstream from the dotted reference line B—B and is referred to by the reference character 24. The feed zone 24 includes the feed housing portion 25, the feed hopper 22, a cooling system 26 and one or more actuators 28, which will be discussed in depth below.

On the downstream side of reference line B—B, there are heating elements 30 which aid in the melting of the plastic for extrusion. The screw extruder 10 has one or more sensors 32 attached. This sensor 32 could be of many different types, such as a plastic melt temperature probe, pressure sensor, or water temperature sensor. The sensor 32 could be positioned at several different locations depending on the process variable that is to be monitored, or there could be multiple sensors to monitor multiple process variables. The sensor 32 provides input to a process controller 34 that can then be set to independently adjust one or more of the actuators 28.

Figure 2:
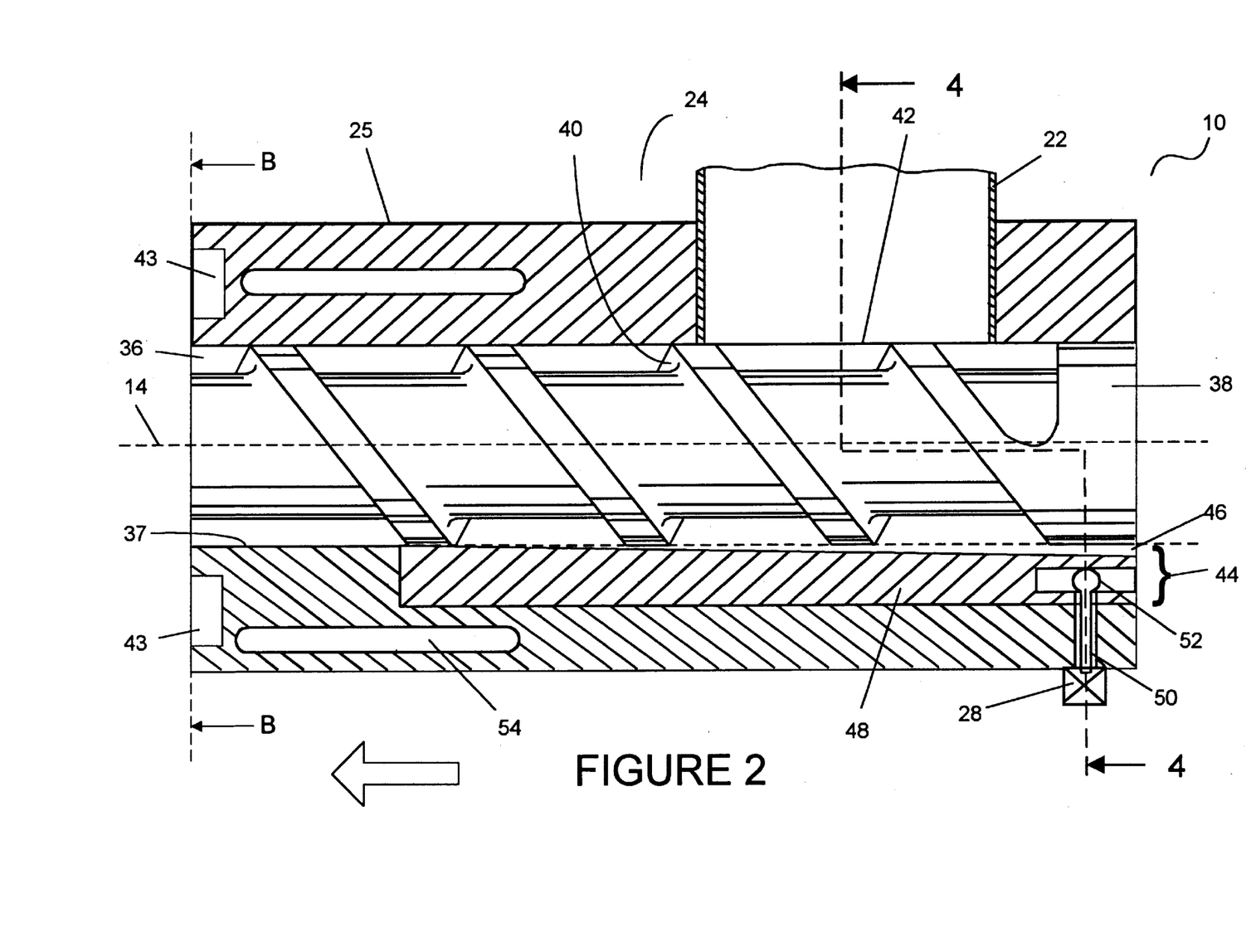
FIG. 2 illustrates a longitudinal sectional view through the feed zone of the barrel of a screw extruder, which corresponds to the cross-sectional view along line 2—2 in FIG. 1 of the portion of the screw extruder to the right of reference line B—B.

FIG. 2 illustrates the feed zone 24 of the screw extruder 10. A large arrow indicates the downstream direction of material flow, and the reference line B—B also seen in FIG. 1 is shown at the downstream end of this figure for orientation purposes. The feed zone 24 includes a feed housing portion 25 having a central bore 36 which defines an inner surface 37. This central bore 36 is symmetrical about central axis 14 and has an extruder screw 38 positioned therein. The extruder screw 38 has screw flights 40 for forward conveyance of material which is introduced into the screw extruder 10 through a feed hopper 22 surrounding a feed passage 42 which opens into the central bore 36. This central bore 36 has one or more groove channels 44 that open into the inner surface 37 of the feed housing portion 25. These groove channels 44 may be parallel to the central axis 14, or may be of a helical design.

The feed housing portion 25 may be an integral portion of the barrel assembly 12 or it may be a separate structure which forms the input end 20 of the barrel assembly 12. If the feed housing portion is not integral to the barrel assembly 12, there may also be included a thermal barrier 43 between the downstream portion 23 of the barrel assembly 12 and the feed housing portion 25 to prevent heat transfer into the feed housing portion 25.

For ease of reference, the term "groove channel 44" will refer to the total cavity cut into the inner surface of the feed housing portion 25 including those areas not accessible to the plastic feed material. "Groove 46" will refer only to the portion of the channel between the key 48 and the central bore 36 which is open to the plastic feed material. Although three groove channels 44 are shown in the drawings, it is to be understood that the number of groove channels 44 is not limited to this number, and more or fewer may be included, depending on feed housing 25 diameter and material composition.

Also, for ease of discussion, the term "radial depth" will refer to a measurement from the inner surface of the central bore 36 to the bottom of one of the groove channels 44 along a radial line through the central axis 14. Similarly, "radial height" will refer to a measurement along a radial line from the inner-most portion of a key 48 to its outer-most portion. Within the groove channels 44 the keys 48 are disposed, which have radial heights less than the radial depths of the groove channels 44. Actuators 28 are attached through actuator stems 50 to actuator heads 52, which contact the keys 48 within their respective groove channels 44. The actuators 28 act to extend or retract the actuator stems 50, and thus to raise or lower the keys 48 within their groove channels 44, thus varying the depth of the grooves 46.

Figure 3:
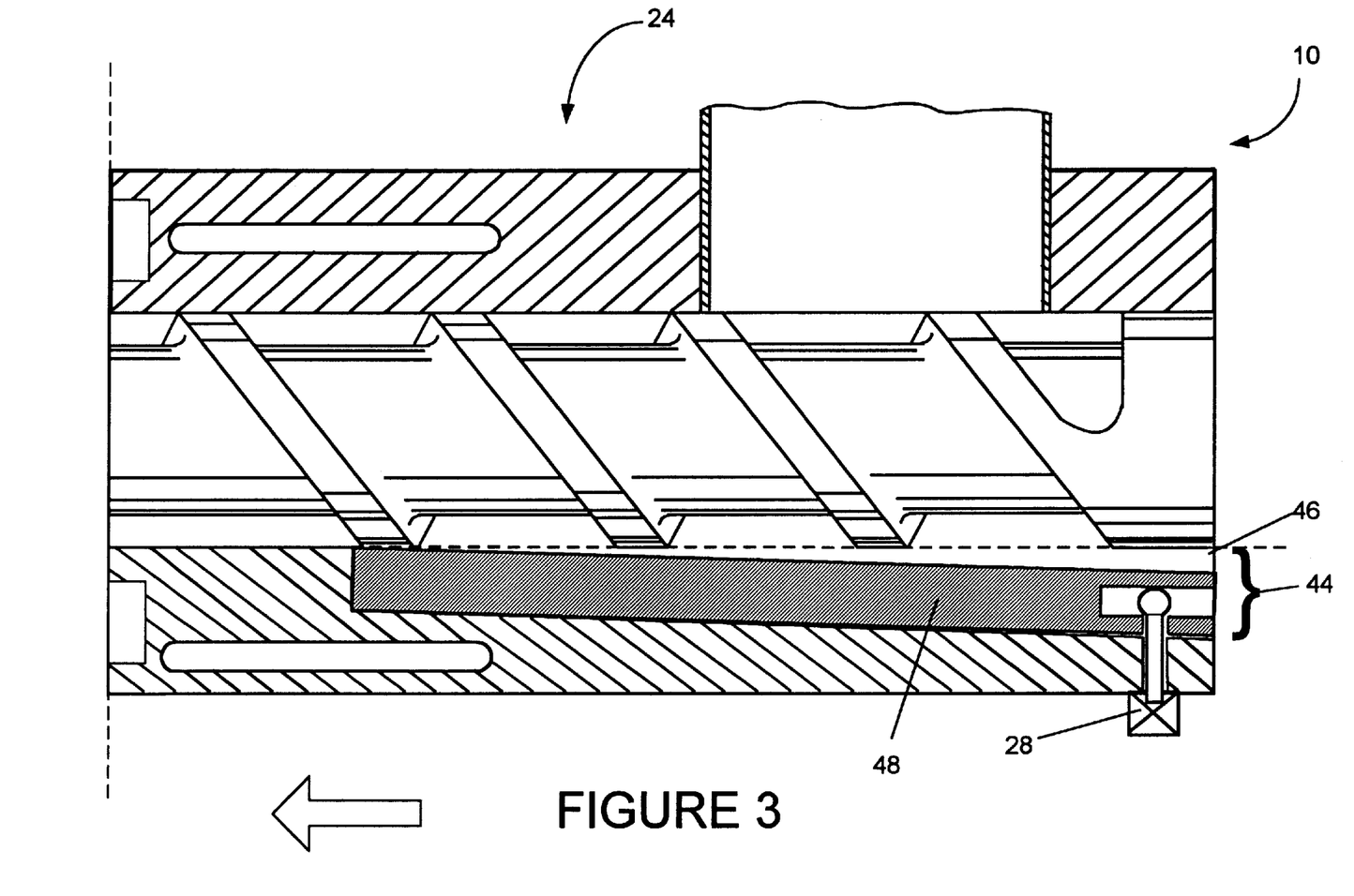
FIG. 3 illustrates the same longitudinal cross-section view of the feed section as in FIG. 2, but shows sloping groove channels into which are placed keys of constant radial height.

In this embodiment, the keys 48 are made to pivot at the downstream end of the groove channels 44, so that the grooves 46 taper to nominally a zero depth. In this case, the cross-section of the key 48 is shaped as a truncated triangle with the downstream base height being substantially equal to the radial depth of the downstream end of the groove channel 44 and the upstream end of the key 48 being of a lesser radial height. The actuator 28 is then positioned to contact the upstream end of the key 48. This configuration avoids accumulation of material at the downstream end of the groove 46 and allows the use of a single actuator 28 in each groove channel 44 to minimize cost. It should be understood, however, that the key 48 might be made to have a constant radial height along its length with a second actuator 28 in contact with the downstream end, or intermediately placed so that either or both ends of the key 48 can be independently raised or lowered. It is also possible to have a pivoting key 48 of constant radial height in a sloping groove channel 44 with a greater upstream or downstream depth. This would similarly allow use of a single actuator 28 at the non-pivoting end of the key 48 to control groove 46 depth. Such a configuration is illustrated in FIG. 3, which shows a feed section 24 having a sloping groove channel 44 with a greater upstream depth. A key 48 of constant radial height is shown which has been lowered in the groove channel 44 by actuator 28 in order to allow groove 46 to contact the feed material. Once again, the downstream direction is indicated by the large arrow.

The actuator 28 can be any one of a variety of mechanisms, some of which are electro-mechanical such as stepper-motor driven lead screws, or solenoids, but which may also include the use of other mechanisms such as thermal bolts, which expand upon heating.

In this version of the preferred embodiment, the actuator 28 is an electro-thermally activated linear actuator. This uses AC or DC electric power to heat and rapidly expand a polymer core. The expanding polymer pushes a piston, the actuator stem 50, which in turn moves the actuator head 52 and thus also the key 48. This type of actuator 28 is made by TCAM Technologies, Inc. and can produce a linear force of 200 lbf. It has a maximum stroke length under a 50 lbf load of 0.150 inches (3.8 mm). The typical depth of the grooves 46 is from 0–0.12 inches (0–3 mm). These actuators are controllable to within 0.0001 inch (2.5 micron), so very precise adjustment can be achieved.

The cooling channels 54 allow coolant to regulate the temperature of the feed zone 24 and keep the temperature low enough to avoid the melting of plastic pellets in the feed zone 24.

Figure 4:
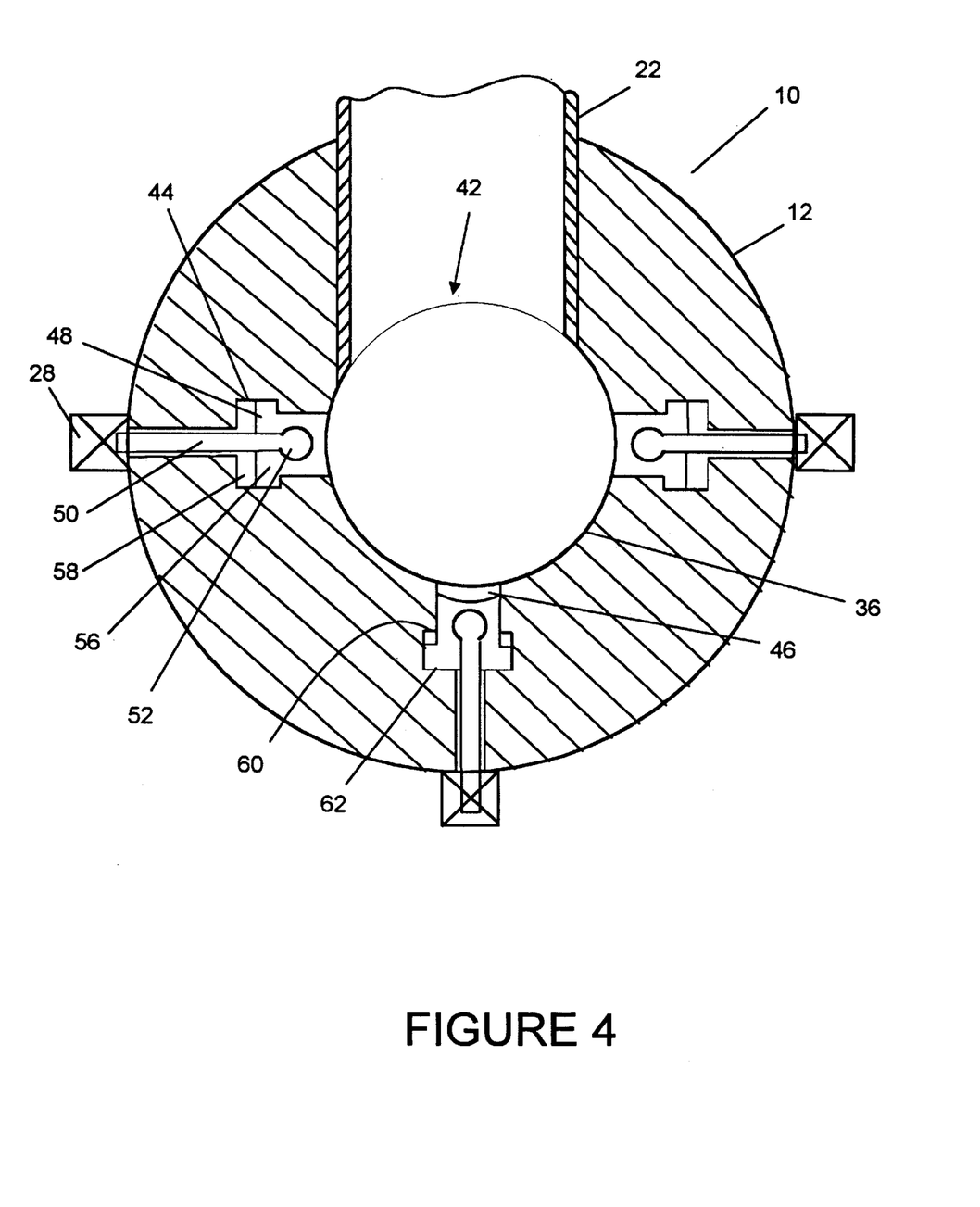
FIG. 4 illustrates a cross-sectional view through the screw extruder barrel along the line 4—4 in FIG. 2.

FIG. 4 illustrates the cross-sectional view along line 4—4 of FIG. 2 with the extruder screw 38 removed. Three groove channels 44 are shown at 90-degree intervals around the inner surface of the feed housing 25. A fourth, abbreviated groove channel 44 could be positioned in the top of the inner surface of the feed housing 25 downstream from the feed hopper 22, but this fourth groove channel 44 would not be visible in this view. As stated before, the number of grooves 46 is not limited to three, nor are the positions of the grooves 46 limited to the placements shown in the figures, and there is no requirement that they be separated at 90-degree intervals.

Typical keys 48 are also shown in cross-section, in this embodiment forming T-shapes, with the actuator heads 52 being enclosed within the stems of the Ts and the actuator stems 50 emerging from the cross-bars 56 of the Ts. In this embodiment, the cross-sections of typical groove channels 44 are also T-shaped with cross-bars 58 whose heights in a radial direction are larger than the heights of the T cross-bars 56 of the keys 48. The inward sides of the groove channel cross-bars 58 thus become inward travel stops 60 and the outward sides become outward travel stops 62 for the radial motion of the keys 48. The keys 48 are disposed in the groove channels 44 so that their motion is limited by the inward travel stops 60 and the outward travel stops 62 and thus the difference in radial heights between the cross-bars 56 of the keys 48 and the cross-bars 58 of the groove channels 44 will be the maximum depths of the grooves 46. It should be understood that the shapes of the groove channels 44 and keys 48 are not limited to T-shaped cross-sections and that many other shapes are encompassed within the true spirit and entire scope of the invention.

In FIG. 4 only one of the keys 48 is shown to be recessed, thus opening its groove 46. It is to be understood that any or all of the grooves 46 may be independently opened in order to control the conveying efficiency of the screw extruder.

Referring now also to FIGS. 1 and 2, as well as FIG. 4, when this version of the preferred embodiment is started for operation, the grooves 46 may be closed by setting the actuators 28 to fully extend the actuator stems 50, so that the keys 48 are fully raised in their respective groove channels 44. This allows minimum torque from the motor to initiate turning of the extruder screw 38. The inward travel stops 60 prevent the keys from extending too far into the central bore 36 and thus interfering with the extruder screw 38.

Material is fed into the feed hopper 22, and enters the central bore 36 through the feed passage 42. The plastic is usually in the form of pellets that are conveyed downstream by the screw flights 40 of the extruder screw 38. After the screw 38 has reached normal operating speed of rotation, any or all of the grooves 46 may be opened by retraction of the actuator stems 50, by activating the actuators 28. The outward travel stops 62 prevent the keys 48 from further outward radial movement, thus establishing maximum groove 46 depths.

In one version of the preferred embodiment, the screw extruder 10 is incorporated into a process control system, which includes attached sensors 28, which convey information to a process controller 34 which in turn controls the actuators 28. The sensor 32 may be of many different types and may be used in several locations on the screw extruder 10 to monitor many different process parameters.

The sensor 32 may be a melt temperature sensor. In this case, temperature information could be sent to the process controller 34, which in turn controls the actuators 28. If the plastic melt material has not already reached normal operating temperature, the grooves 46 can remain closed or be only slightly opened. As the plastic melt material approaches thermal equilibrium, the groove 46 depth may then be increased gradually to match the conveying efficiency in the feed zone 24 to the efficiency with which the plastic material is melted. When the plastic melt material reaches the normal operating temperature range for the type of plastic being used, the process controller 34 can then set the groove 46 depth to an "equilibrium setting", making no further adjustment unless variations in temperature or some other process parameter makes further adjustment necessary.

Fluctuations in the melt temperature may result from such factors as poor mixing of material. The groove 46 depths can be continuously varied by use of the controller 34 to eliminate such fluctuations and ensure stable performance of the screw extruder 10.

Alternatively, the sensor 32 could be used to monitor pressure in the barrel assembly 12 or at the die head 18. If the screw 38 conveys material from the feed zone 24 to the heater 30 too quickly, the material may not be melted properly when it reaches the die 18 at the output end 16. This can result in a pressure build-up, which can be detected by the sensor 32. This information can be sent to the process controller 34, to control the actuators 28 to decrease the groove 46 depth. This will decrease the coefficient of friction in the feed zone 24, thus decreasing the efficiency of conveying in this zone. As material is conveyed less efficiently, the material has more time to melt. This will allow an increase in the melt temperature and thus the pressure will decrease. When the pressure has decreased to an appropriate level, the groove 46 depth can be adjusted to an "equilibrium" value to maintain optimum performance. If there are fluctuations in pressure, the sensor 32 can detect them and the groove 46 depths can be continuously varied by use of the controller 34 to eliminate such fluctuations and ensure stable performance of the screw extruder 10.

Since the composition of feed material is directly related to its melting point, monitoring of die 18 pressure may be an especially important parameter in this control process loop. If plastic is assumed to be of a certain composition, it may, in reality, have been mistakenly labeled or may contain impurities that would effect the melting temperature. The above-described method of continual adjustment for proper pressure allows for safe operation of the screw extruder 10, where otherwise there might be danger of an unsafe build-up of pressure.

It is also possible to have multiple sensors 32 that have been positioned at different locations on the screw extruder 10, so that, for example, die 18 pressure motor torque, or melt temperature could be simultaneously monitored and any or all of the groove 46 depths automatically adjusted accordingly.

In addition to the above mentioned examples, various other modifications and alterations of the inventive device may be made without departing from the invention. Accordingly, the above disclosure is not to be considered as limiting and the appended claims are to be interpreted as encompassing the true spirit and the entire scope of the invention.

INDUSTRIAL APPLICABILITY

The present improved screw extruder 10 is well suited for application in manufacture of extruded parts, particularly plastic extruded parts, and is a major improvement over existing mechanisms due to its more precise control and decreased complexity.

A screw extruder has a variety of process parameters which are involved in its safe and economical operation, one such parameter being pressure. Since the extruded material is forced through a die to form the final product, great pressures, as much as 6,000 psi, may build inside the downstream portion of a barrel assembly, and may reach as high as 15,000–45,000 psi in the feed housing portion, even under normal operating conditions. Many screw extruders also use heaters to heat the downstream portion of the barrel assembly and the die. In cases where material is delivered to the melt zone more rapidly than the material can be melted, even greater than normal pressures can build. This can lead to safety concerns where this heated material builds abnormal pressure inside the barrel assembly.

The present invention addresses these concerns by providing a very precise apparatus for adjusting depths of grooves 46 in the feed housing portion 25, thereby controlling the efficiency with which the material is delivered to the melt zone or the extrusion die 18. This directly affects the pressure build-up in the barrel assembly 12. The actuators 28 in the preferred embodiment are capable of adjustments to groove 46 depth of 0.0001 inch (2.5 micron), therefore control over the resultant pressure can be very finely controlled. In addition, the electro-thermal nature of the actuators 28 allows improved ease of incorporation into process control systems, which allows for continual and automatic adjustment. This results in improved safety and reliability of operation.

Besides concerns for operator safety, excessive pressure causes wear on components which can result in decreased useful life for a screw extruder and its parts. The present screw extruder 10, which can monitor and self-adjust for excessive pressure, can thus incur lower component replacement costs and reduced "downtime" from mechanical failures.

Efficiency of operation is dependent on other process parameters as well. For material to be conveyed efficiently in a feed zone, it is important that the pellets of material not melt. For this reason, the feed housing usually is thermally isolated, and has a cooling system to remove heat. For such a design, there is a price to pay in efficiency, since as much as 30–40% of the mechanical energy may be lost through the cooling water.

The present screw extruder 10 addresses this concern by allowing easy monitoring of coolant temperature or material temperature in the barrel assembly. Due to the improved ease of incorporation into a process control system, this information can be used to adjust conveying efficiency to optimize this process parameter. The resulting increase in overall efficiency provides cost savings due to decreased power consumption, decreased volume of coolant, and smaller design requirements for pump throughput. Additionally, since the actuators 28 are less bulky and less complex, there is more flexibility in placement of cooling channels 54 and in the design and application of a cooling system 26.

The frictional characteristics of different materials can vary widely and these variations have a large effect on the conveying efficiency of a screw in a feed zone. Some prior screw extruders with less adjustable grooves have necessarily been designed for specific materials, thus making them highly specialized.

The present screw extruder 10 can be adapted to a wide variety of materials with differing frictional characteristics by very precisely controlling groove 46 depths and conveying efficiency. It can therefore replace a number of these highly specialized machines, saving cost and factory floor space.

For the above, and other reasons, it is expected that the screw extruder 10 and the method of use of the present invention will have widespread industrial applicability. Therefore, it is expected that the commercial utility of the present invention will be extensive and long lasting.

What is claimed is:

1. A screw extruder, comprising;
   a barrel assembly wherein:
   said barrel assembly has a cylindrical central bore defining an inner surface; and
   said barrel assembly has an input end and an output end;
   said barrel assembly input end includes a feed housing portion wherein:
   said feed housing portion has at least two groove channels which open into the inner surface of said feed housing portion, each groove channel having a length, and a radial depth; and
   said feed housing portion has an opening for introduction of material into the central bore;
   a shaping orifice situated at the output end of the barrel assembly;
   an extruder screw positioned within the central bore;
   a key disposed in each groove channel, each of said keys having a radial height, an upstream end and a downstream end; and
   at least one independently activated actuator for each of said keys which adjusts the radial depth of each of said keys in each of said groove channels independently from said radial depth of any other said key in any other said groove channel.

2. The screw extruder of claim 1 wherein:
   said feed housing portion is a separate structure which forms the input end of said barrel assembly and further includes a thermal barrier to prevent heat transfer into the feed housing portion.

3. The screw extruder of claim 1 wherein:
   the actuators are controlled by a feed-back mechanism that monitors at least one desired process parameter and adjusts the actuators accordingly.

4. The screw extruder of claim 3 wherein:

said process parameter is a variable selected from the group consisting of barrel assembly pressure, screw torque, material melt temperature, coolant flow and diehead pressure.

5. The screw extruder of claim 1 wherein:

each of said keys pivots at said downstream end and a single actuator contacts one of said keys at said upstream end.

6. The screw extruder of claim 1 wherein:

each of the keys has a T-shaped cross-section and is disposed within one of said groove channels having a T-shaped cross-section.

7. The screw extruder of claim 1 wherein:

at least one of said at least two groove channels has uniform radial depth throughout the length of said at least one groove channel.

8. The screw extruder of claim 7 wherein:

at least one of said keys disposed in said at least one groove channel has uniform radial height throughout the length of said at least one key.

9. The screw extruder of claim 7 wherein:

at least one of said keys disposed in said at least one groove channel has non-uniform radial height throughout the length of said at least one key.

10. The screw extruder of claim 1 wherein:

at least one of said at least two groove channels has non-uniform radial depth throughout the length of said at least one groove channels.

11. The screw extruder of claim 10 wherein:

at least one of said keys disposed in said at least one groove channel has uniform radial height throughout the length of said at least one key.

12. The screw extruder of claim 10 wherein:

at least one of said keys disposed in said at least one groove channel has non-uniform radial height throughout the length of said at least one key.

13. The screw extruder of claim 10 wherein:

said at least one groove channel has an upstream end and a downstream end; and said at least one groove channel increases in radial depth from said downstream end to said upstream end.

14. In an improved screw extruder, of the type having a barrel assembly wherein said barrel assembly has a cylindrical central bore defining an inner surface, an input end and an output end, said barrel assembly input end includes a feed housing portion having at least two groove channels which open into the inner surface of said feed housing portion, each groove channel having a radial depth, the feed housing portion further having an opening for introduction of material into the central bore, a shaping orifice situated at the output end of the barrel assembly, an extruder screw positioned within the central bore, and a key disposed in each groove channel, each of said keys having an upstream end and a downstream end, the improvement comprising:

at least one independently activated actuator for each key which independently adjusts the radial depth of each of said keys in each of said groove channels independently from said radial depth of any other said key in any other said groove channel.

15. The screw extruder of claim 14 wherein:

the actuators are controlled by a feed-back mechanism that monitors at least one desired process parameter and adjusts the actuators accordingly.

16. The screw extruder of claim 15 wherein:

said process parameter is a variable selected from the group consisting of barrel assembly pressure, screw torque, plastic melt temperature, coolant flow and diehead pressure.

17. The screw extruder of claim 14 wherein:

each of said keys pivots at said downstream end and a single actuator contacts one of said keys at said upstream end.

18. The screw extruder of claim 14 wherein:

each of the keys has a T-shaped cross-section and is disposed within one of said groove channels having a T-shaped cross-section.

19. A method of controlling extrusion of material from a screw extruder comprising the steps of:

providing a screw extruder having:
a barrel assembly wherein:
said barrel assembly has a cylindrical central bore defining an inner surface; and
said barrel assembly has an input end and an output end;
said barrel assembly input end includes a feed housing portion wherein:
said feed housing portion has at least two groove channels which open into the inner surface of said feed housing portion, each groove having a radial depth; and
said feed housing portion has an opening for introduction of material into the central bore;
a shaping orifice situated at the output end of the barrel assembly;
an extruder screw positioned within the central bore;
a key disposed in each groove channel; and
at least one independently activated actuator for each of said keys which adjusts the radial depth of each of said keys in each of said groove channels independently from said radial depth of any other said key in any other said groove channel; and adjusting the actuators independently to control extrusion of material from the screw extruder.

20. The method for controlling extrusion of claim 19 wherein:

the independently adjusted actuators are controlled by a feed-back mechanism that monitors at least one desired process parameter and adjusts the actuators accordingly.

21. The method for controlling extrusion of claim 20 wherein:

said process parameter is a variable selected from the group consisting of barrel assembly pressure, screw torque, plastic melt temperature, coolant flow and diehead pressure.

\* \* \* \* \*